Dec. 1, 1959     D. B. HUMES ET AL     2,914,879
ILLUMINABLE FLOAT WITH BITE SIGNAL
Filed March 14, 1957     2 Sheets-Sheet 1
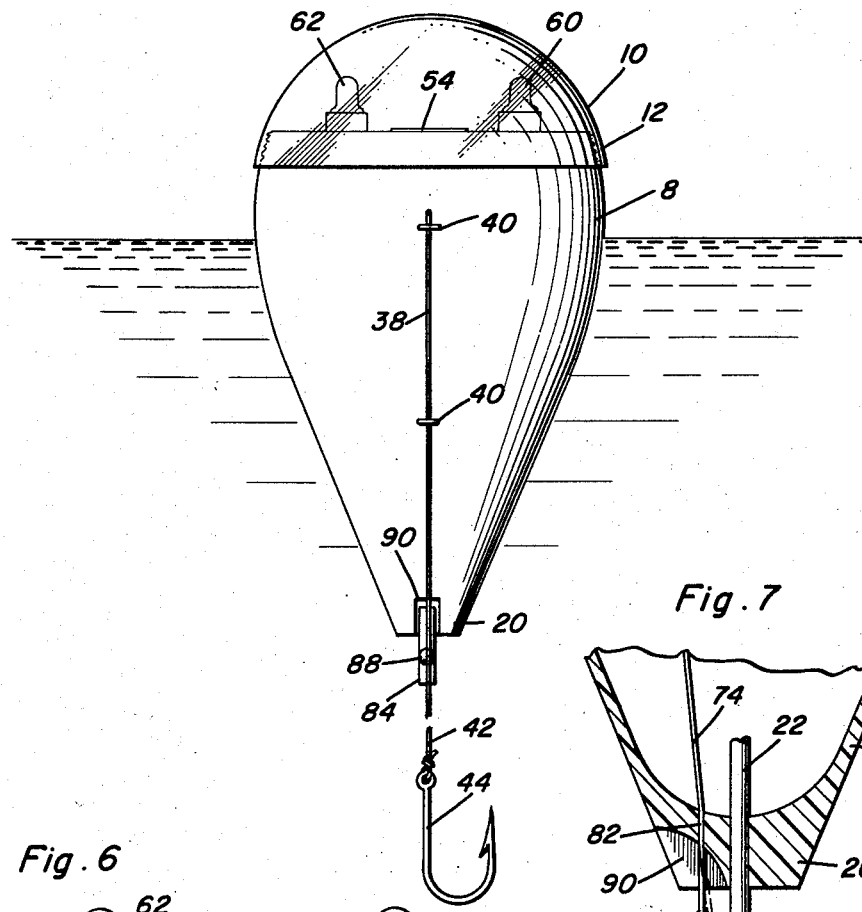
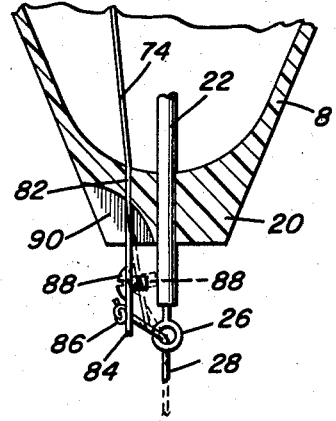
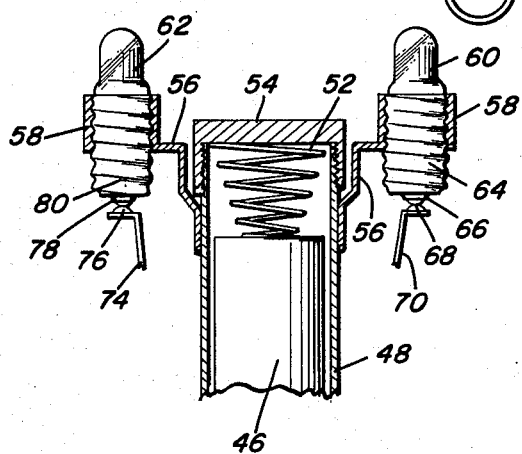
David B. Humes
Roy F. Humes, Jr.
INVENTORS

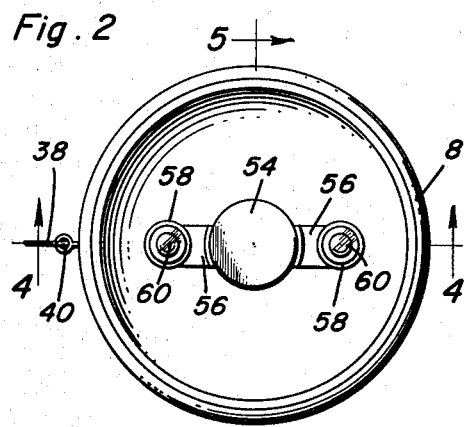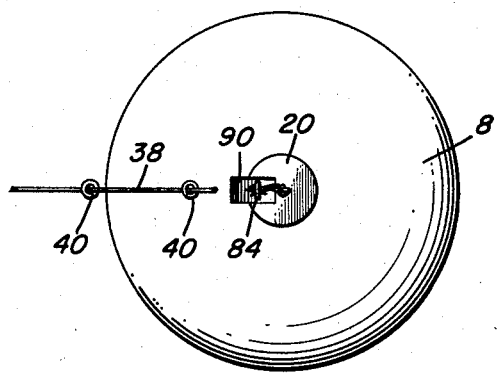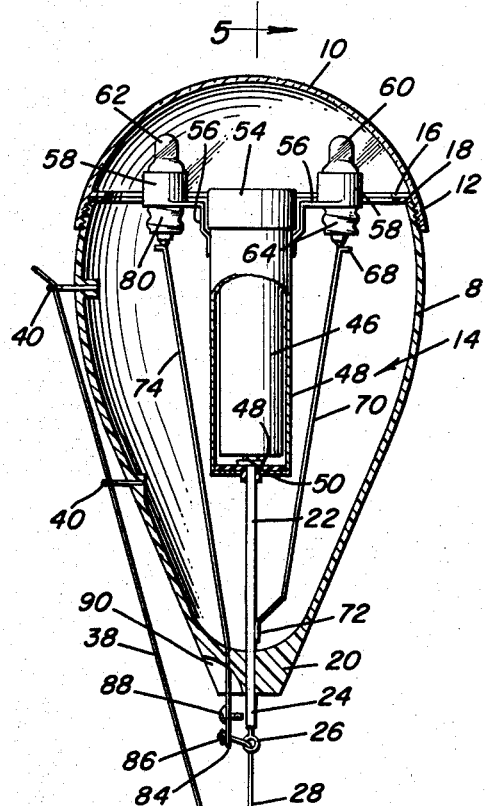

United States Patent Office 2,914,879
Patented Dec. 1, 1959

2,914,879

ILLUMINABLE FLOAT WITH BITE SIGNAL

David B. Humes and Roy F. Humes, Jr., Waco, Tex.

Application March 14, 1957, Serial No. 646,130

3 Claims. (Cl. 43—17)

The present invention relates to a night fishing float characterized by a constantly lit electric lamp which serves to mark the fishing spot, that is, the location of the float, and a pull actuated bite signalling lamp which comes on and provides an intermittent or flashing signal when the baited fishing line has been taken.

Illuminable night fishing floats, as the preceding general statement of the invention implies, are old. Believing that a better solution of the common problem can be achieved, a structurally distinct and improved float construction is herein offered for adoption and use by those who find it expedient and practical to use self-contained lamp-equipped floats.

One objective is achieved through the adoption and use of a sectional float. This comprises a plastic shell which is generally pear-shaped and is characterized by an open top body portion and a transparent, readily attachable and detachable, dome-shaped cap serving as a removable cover for the otherwise open end of the body portion.

Being hollow, the float or shell provides a chamber for the interiorly disposed and protectively housed parts; namely, a flashlight battery, a holder or casing therefor, first and second lamp bulbs and effective conductors or arms cooperating with the base portions of the bulbs.

Novelty is also predicated on the appropriation and use of a rod of current conducting material which has a lower portion embedded in the base or lower part of the float and which has a depending lower end which cooperates with a cooperating part in providing a circuit make and break device or switch which is controlled by a pull actuated trip cord.

Objects and other worthwhile and advantageous aspects of the concept will become more readily apparent from the following description and accompanying drawings.

In the drawings:

Fig. 1 is an elevational view of the novel illuminable float readied for night fishing use;

Fig. 2 is a top plan view with the covering cap removed;

Fig. 3 is a bottom plan view;

Fig. 4 is a central view in section and elevation which may be considered as taken approximately on the plane of the line 4—4 of Fig. 2;

Fig. 5 is a view at right angles on the line 5—5 of Fig. 2 with the cap in place;

Fig. 6 is an enlarged view of a fragmentary type in section and elevation detailing the battery casing and lamp supporting brackets thereon; and Fig. 7 is an enlarged view of a fragmentary type in section and elevation detailing the circuit make and break means.

As before stated, the invention features a hollow float which, more specifically, takes the form of a sectional shell, the body section or portion of which is denoted at 8 (Fig. 4) and the cover or cap section being denoted at 10. The cap is concavo-convex and is of clear plastics and has its lower rim-like portion 12 internally screw threaded and engaging cooperating threads on the upper open end portion of the body 8. The cap is sometimes referred to as a dome and it permits access to be had to the chamber or space 14. Interiorly it is provided with an endless laterally directed flange 16 which clamps upon and holds the packing ring or gasket 18 in the fluid-tight position seen in Fig. 4. The lower portion of the body section 8 tapers downwardly and terminates in a relatively small base 20. Therefore, the over-all shell or float may be said to be approximately pear-shaped. It is in this base portion that an axially disposed current conducting rod 22 is mounted. The lower end portion 24 of the rod projects and depends below the base and terminates in an eye 26 which serves to accommodate the pull actuated trip cord or equivalent element 28. The lower end of the trip cord is tied at 30 to a ring or eye 32 carried by a swivel 34 whose upper eye or ring 36 is connected to the lower end of the fishing line 38. The fishing line is exteriorly disposed and freely slidable through guide and retaining eyes 40 mounted on the exterior of the float. Also connected to the eye 32 is the upper end of a leader 42 which in practice is provided with a fish hook 44, as seen in Fig. 1.

With reference now to the dry cell or battery, this is denoted at 46 and is removably mounted in a cylindrical casing 48 which is fixedly supported atop the portion of the rod 22 which projects into the chamber 14. This rod terminates in a contact head 48 which cooperates with a contact button 50 on the lower end of the battery. The battery is operatively mounted in place by a coil spring 52 (Fig. 6) in contact with the removable closing cap 54 on the battery casing 48. The casing also serves as a mount for a pair of diametrically opposite, suitably shaped outstanding brackets 56 terminating in internally screw threaded socket members 58, one of which supports the first lamp or light bulb 60 and the other the second lamp or light bulb 62. More specifically, the screw-base 64 of the lamp 60 screws down through the socket member at the right in Fig. 6 and has its contact 66 engaging a contact 68 on the laterally directed upper end of a current conducting arm 70. The lower end of the arm is anchored at 72 on the rod 22 within the limits of the chamber or space 14.

There is a similar strap metal arm 74 beneath the lamp 62 and this has its major portion confined in the chamber with a contact 76 on its upper laterally directed end engaging the contact 78 on the lamp base 80 (Fig. 6). The lower end portion 82 of the arm is embedded in the base 20 and has the free end flexibly resilient portion 84 depending below the base and paralleling the extended rod-end 24. The terminal portion has a suitable hole therein to accommodate the attached knotted end 86 of the trip cord 28. Above the trip cord there is a set screw 88 which provides an adjustable and movable contact element. This element is engageable, obviously, with the rod and, therefore, the end portion 84, setscrew and end portion 24 of the rod provide a switch or what is alternatively referred to as circuit make and break means. It will be noted in Figs. 4 and 7 that a clearance and guide notch 90 is provided on one side of the base 20 and this sheathes the end portion of the arm 74, more specifically, the end portion 84 as seen in Fig. 7. This notch stabilizes the in and out movements of the end portion 84 required in opening and closing the switch in the manner seen in Fig. 7.

It will be evident that the first named lamp 60 is constantly on. Therefore, this lamp serves, obviously, to help the user to spot and keep an eye on the location or position of the thus illuminated float. On the other hand, the second or bite signalling lamp 62 is normally off. When, however, a strike is had, the stress or pull exerted on the leader 42 will, in turn, slide and extend the trip cord 28 through the eye 26, thus closing the circuit and bringing the lamp 62 into play. The inherent spring action in the end portion 84 serves to open the switch again, and therefore the repeated jerking of the fish line by the hooked fish will, more likely than not, bring about an intermittent operation of the bite signalling lamp.

Since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An illuminable night fishing float comprising a hollow buoyant water-tight shell having a body portion which is open at its top and closed at the bottom, said open top being provided with a normally closed but readily applicable and removable closing cap, said cap, when removed affording access to the interior chamber portion of the over-all shell, a stationary current conducting rod having a lower end portion embedded in the bottom portion of said shell and depending below said bottom, and an upper end portion extending upwardly and into the chamber of the shell and terminating in a plane in the lower part of the chamber, a battery casing in axial alignment with and fixedly mounted atop said rod and confined in said chamber, a spring biased dry cell battery removably mounted in said casing and accessible through the open top of the body portion, a first lamp supported on said casing, a first conductor arm confined in said chamber having permanent connection at a lower end thereof with a portion of said rod within the confines of said chamber having operating contact connection at its upper end with said first lamp, said first lamp being a constantly lit source of light when the float is in use, a second lamp supported on said casing, a second conductor arm independent of the first named arm and having a lower end portion fixed in the bottom of said shell and an upper portion having operating contact with said second lamp, the lower portion of said second arm being resilient and extending down through the cooperating portion of the shell and depending alongside but being spaced from the projecting lower end portion of the rod and having a contact element releasably engageable with the lower end portion of the rod to thus utilize the rod as a current conductor and said contact element as a co-operating switch in a manner to intermittently operate the second named lamp, the lower end of said rod terminating in an eye, and a pull actuated trip cord passing slidingly through said eye and having its upper end connected with the lower end portion of the second named arm, the lower end of said trip cord being connectible with a fishing line leader, said cap when removed also permitting access to be had to the lamps and said conductor arms.

2. The structure defined in claim 1 and, in combination, a fishing line, retaining and guiding eyes for said line mounted exteriorly on said shell, a portion of said fishing line being freely slidable through said eyes, said fishing line being provided on its lower end with a swivel, said swivel being connected with a lower free end of said trip cord, and a leader connected at its upper end to said swivel.

3. The structure defined in claim 1 and wherein said casing is provided with diametrically opposite outstanding brackets terminating in socket members, said lamps being removably mounted in their respective socket members, the lower portion of said shell having a clearance notch in one side opening through the bottom of the shell and the lower end portion of said second arm being partly sheathed and movable in said notch.

References Cited in the file of this patent

UNITED STATES PATENTS

| | | |
|---|---|---|
| 1,736,921 | Derr | Dec. 3, 1929 |
| 2,445,459 | Digmon | Aug. 3, 1948 |
| 2,534,709 | Goertzen | Dec. 19, 1950 |
| 2,722,763 | Miner et al. | Nov. 8, 1955 |
| 2,777,238 | Taylor et al. | Jan. 15, 1957 |